United States Patent
Pokhariyal

(10) Patent No.: US 7,380,238 B2
(45) Date of Patent: May 27, 2008

(54) METHOD FOR DYNAMICALLY ADDING NEW CODE TO AN APPLICATION PROGRAM

(75) Inventor: Shuvranshu Pokhariyal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 598 days.

(21) Appl. No.: 10/135,991

(22) Filed: Apr. 29, 2002

(65) Prior Publication Data

US 2003/0204833 A1    Oct. 30, 2003

(51) Int. Cl.
*G06F 9/44* (2006.01)

(52) U.S. Cl. ..................................... 717/124

(58) Field of Classification Search ............... 717/128, 717/126, 141, 145, 158, 166, 124; 711/137; 719/330, 312
See application file for complete search history.

(56) References Cited

U.S. PATENT DOCUMENTS

| | | | | |
|---|---|---|---|---|
| 5,693,739 | A * | 12/1997 | McEntire et al. | 528/112 |
| 6,108,715 | A * | 8/2000 | Leach et al. | 719/330 |
| 6,151,639 | A * | 11/2000 | Tucker et al. | 719/316 |
| 6,810,519 | B1 * | 10/2004 | Hicks | 717/166 |
| 7,017,146 | B2 * | 3/2006 | Dellarocas et al. | 717/106 |
| 7,272,815 | B1 * | 9/2007 | Eldridge et al. | 717/101 |
| 2003/0056200 | A1 * | 3/2003 | Li et al. | 717/128 |

OTHER PUBLICATIONS

"Remote Evaluation", by James W. Stamos, and David K. Gifford, 1990 ACM, "http://delivery.acm.org/10.1145/90000/88631/p537-stamos.pdf?key1=88631&key2=2691930111&coll=ACM &dl=ACM&CFID=39693857&CFTOKEN=74217378".*
"A Method for Obtaining Digital Signatures and Public-Key Cryptosystems", R. L. Riverst, A. Shamir, and L. Adleman, ACM Feb. 1978, "http://theory.lcs.mil.edu/~rivest/rsapaper.pdf".*
Birrell, Andrew D. et al., "Implementing Remote Procedure Calls", ACM Transactions on Computer Systems, vol. 2, No. 1, Feb. 1984, pp. 39-59, "http://www.cs.princeton.edu/courses/archive/fall03/cs518/papers/rpc.pdf".*

* cited by examiner

*Primary Examiner*—Wei Zhen
*Assistant Examiner*—Chih-Ching Chow
(74) *Attorney, Agent, or Firm*—Blakely, Sokoloff, Taylor & Zafman LLP

(57) ABSTRACT

A method of dynamically adding new code to an application program. An application, while running, receives a procedure call from another application. The application receives one or more parameters in connection with the procedure call. The application receives new code to be added to the application. The application determines, based on the parameters, whether the new code is authorized to be added to the application. If the new code is authorized, the application loads the new code while the application is running. The application tests the new code and stores the new code if the new code runs properly.

30 Claims, 4 Drawing Sheets

METHOD FOR DYNAMICALLY ADDING NEW CODE TO AN APPLICATION PROGRAM

FIELD OF INVENTION

An embodiment of the present invention relates to modifying an application program. More particularly, an embodiment of the present invention relates to dynamically adding new code to an application program.

BACKGROUND

Generally, a computer program is generated by writing the program in source code (programming language) and compiling the source code in order to convert it to machine code (machine language). In order for a computer program to be modified, new source code is added to the program. In many cases, the person who wrote the program adds the new source code. Typically, there is no security mechanism to verify that the person adding the new source code is authorized to revise the program, which can result in unauthorized revisions to the program.

Once the new source code is added, the original program is recompiled to create a revised program. The revised program is verified, tested and provided to customers. Customers typically shut down their systems in order to install the revised program.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1A:
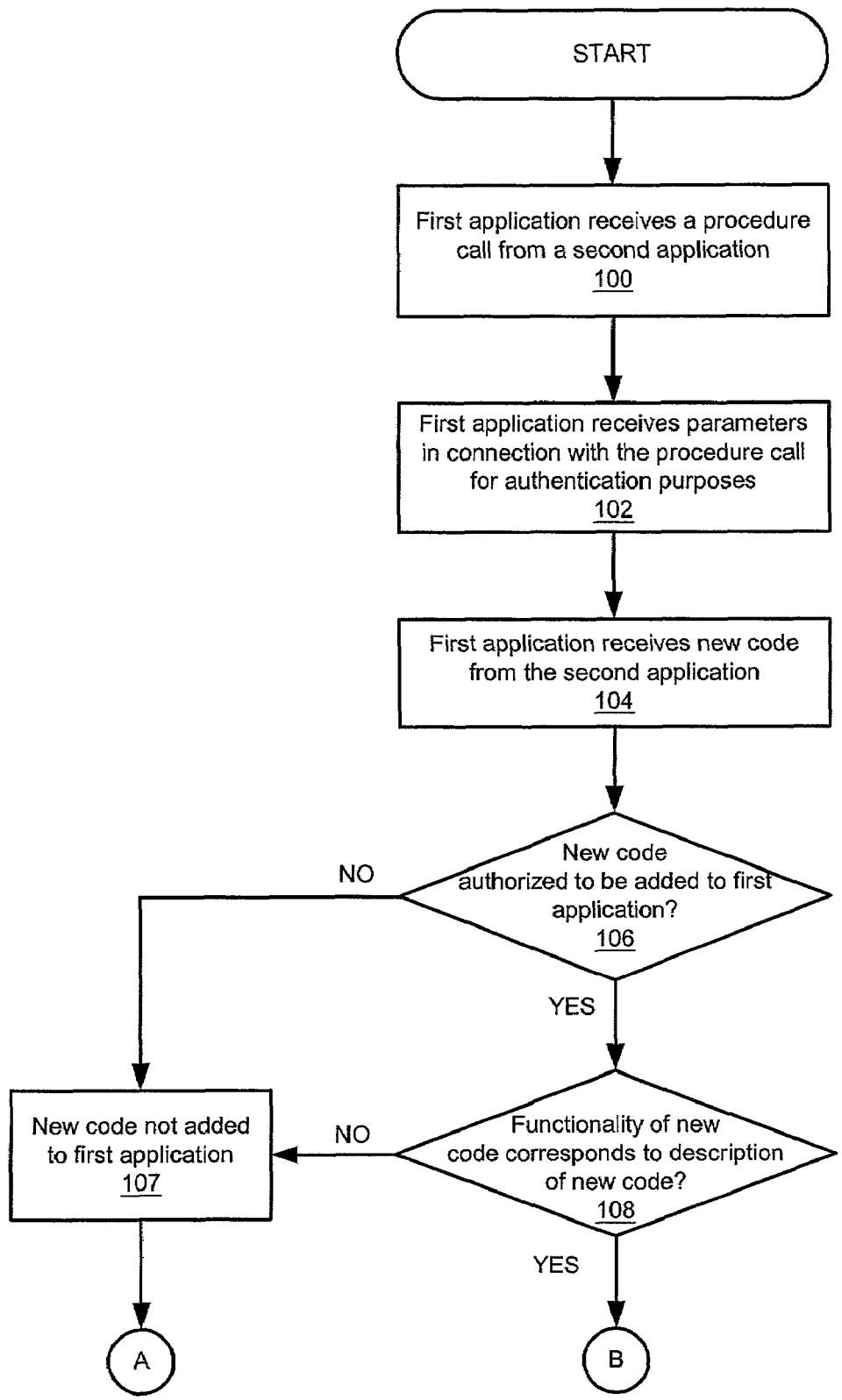
FIG. 1a and FIG. 1b are a flow chart of a method of one embodiment of dynamically adding new code to an application program.

A method of dynamically adding new code to an application program is described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A method of dynamically adding new code to an application program is described. A first application receives a procedure call from a second application. As parameters in connection with the procedure call, the first application receives a digital signature and a description of new code to be added to the first application. The first application receives from the second application the actual new code to be added to the first application. The first application uses the digital signature to establish whether the new code is authorized to be added to the first application. The first application uses the description of the new code to establish whether the functionality of the new code corresponds to the description of the functionality of the new code. When the new code is not authorized to be added to the first application or the actual functionality of the new code does not correspond to the description of the functionality, the first application does not load the new code. Optionally, the first application transmits a message to the second application stating that the new code was not successfully received.

Conversely, when the first application determines that the new code is authorized to be added and that the actual functionality of the new code corresponds to the description of the functionality, the first application loads the new code dynamically, i.e., while the first application is running, in the same process as the first application or in a different process.

The first application tests the new code for compatibility and functionality, in order to determine whether the new code runs properly. If the new code does not run properly, the first application unloads the new code, and optionally may send a message to the second application indicating that the new code has failed. Conversely, if the new code runs properly, the new code is available to the first application, which stores the new code and transmits a message to the second application indicating that the new code was successfully received.

Determining whether the new code is authorized to be added and verifying the functionality of the new code reduces the possibility of an unauthorized revision of an application program. Dynamically loading and testing the new code eliminates the need to shut down a system in order to revise the application program.

Figure 1B:
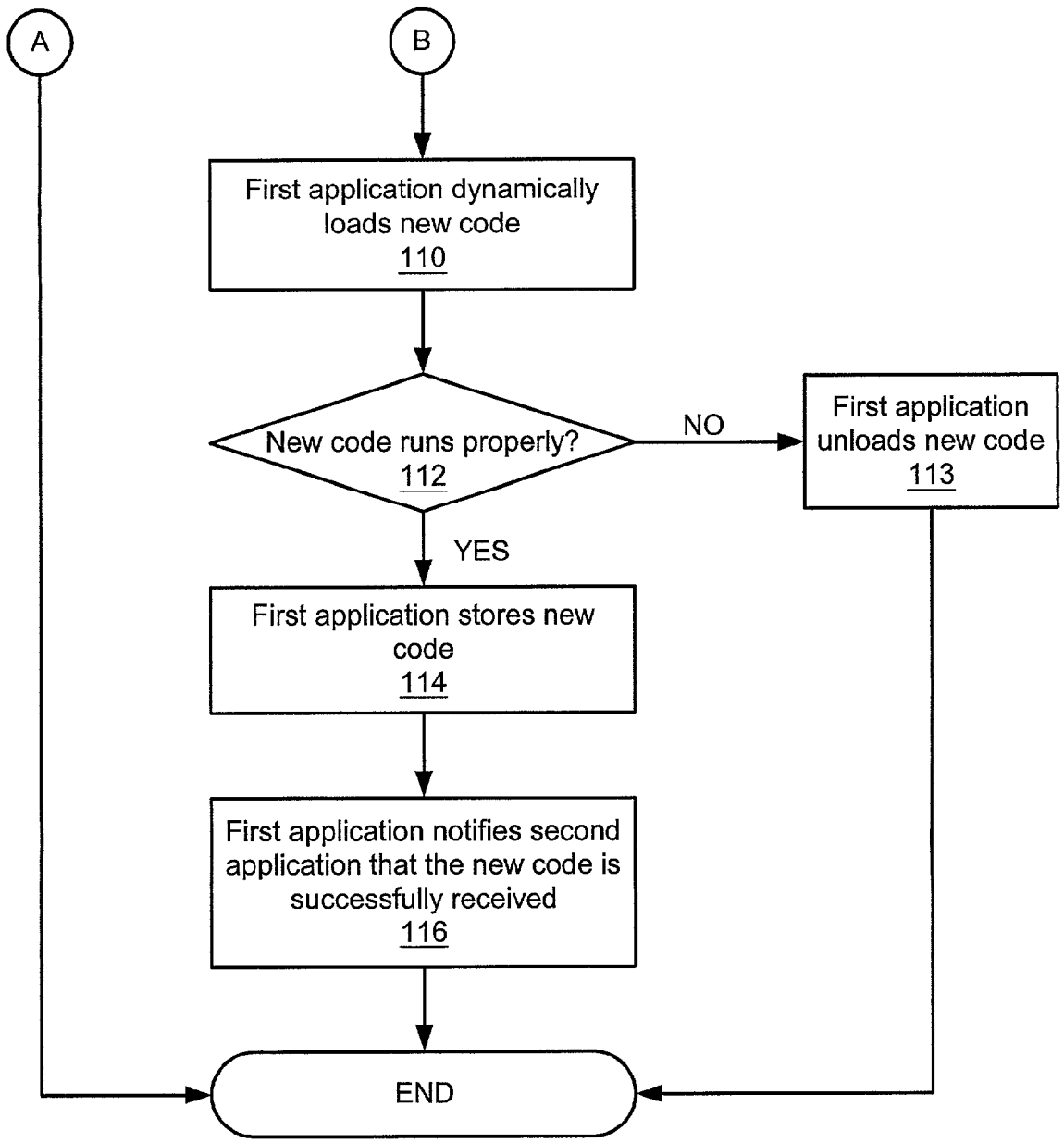

FIG. 1a and FIG. 1b are a flow chart of a method of one embodiment of dynamically adding new code to an application program. For purposes of illustration and ease of explanation, FIG. 1a and FIG. 1b will be described in specific terms of an application program. However, the technique described herein is not limited to an application program and may be used to dynamically add new code to any type of program, for example, system software.

At 100, a first application running on an electronic device receives a procedure call (also commonly known in the art as a function call) from a second application. In one embodiment, the procedure call is a remote procedure call (RPC) from a second application running on a different electronic device than the electronic device on which the first application is running. A RPC is a request made across a wired or wireless network by an application in one device to an application in another device. A RPC is known to those of ordinary skill in the art, and thus will not be discussed further except as it pertains to embodiments of the present invention. In one embodiment, the RPC is made using simple object access protocol (SOAP). However, the RPC can be made using any other RPC mechanism, e.g., remote method invocation (RMI) or distributed component object model (DCOM). In an alternative embodiment, the procedure call is an inter-process procedure call from a second application running on the same electronic device as the first application.

In one embodiment, a pre-defined interface into the new code is established in advance of the procedure call, allowing the first application to integrate the new code with the existing code by making a call into the new code. In an alternative embodiment, an interface into the new code that is not pre-defined is provided by the second application. In this case, the first application modifies itself, e.g., in accordance with information (which may be provided by a user, for example) regarding usage and configuration of the new code, in order to integrate the new code.

At 102, the first application receives from the second application parameters in connection with the procedure call. In one embodiment, the parameters include a digital signature and a description of new code to be added to the first application. A digital signature is a transformation of data into a mathematical summary, or hash, which is then encrypted and used in connection with authenticating the data. A digital signature is known to those of ordinary skill in the art, and thus will not be discussed further except as it pertains to embodiments of the present invention. See, e.g., National Institute of Standards and Technology, Federal Information Processing Standards Publication 186, "Digital Signature Standard (DSS)," May 19, 1994. For purposes of illustration and ease of explanation, FIG. 1a and FIG. 1b will be described in specific terms of receiving parameters that include a digital signature and a description of new code to be added to the first application, and using the digital signature and the description of the new code to authenticate data. However, the first application can receive parameters other than a digital signature or a description of new code, and can authenticate data other than by using a digital signature or a description of new code.

At 104, the first application receives from the second application new code to be added to the first application. In one embodiment, the new code is written in JAVA™ programming language. However, the new code can be written in any programming language, e.g., C++ or JAVASCRIPT™ programming language. At 106, the first application uses the digital signature in order to establish whether the new code is authorized to be added to the first application. For example, the first application decrypts the hash in the digital signature, generates a hash of the new code and analyzes the two hashes in order to determine whether they are identical. When the new code is not authorized to be added to the first application, at 107 the first application does not load the new code. Optionally, the first application transmits a message to the second application stating that the new code cannot be loaded and/or providing a reason.

Conversely, when the first application is authorized to be added to the first application, at 108 the first application determines whether the functionality of the new code corresponds to the functionality contained in the description of the new code. In one embodiment, the first application reads the description of the new code and reads the new code in order to determine whether the new code's functionality is as described in the description of the new code. For example, the first application reads the description of the new code, which contains information describing the new code's read/write access to specific locations on the hard drive, and the first application reads the new code to verify that the read/write access in the new code corresponds to the description. However, the first application may use other techniques to establish whether the functionality of the new code is as described in the description of the new code. In another embodiment, for example, the first application reads the description of the new code to in order to determine the functionality of the new code and restricts the new code to the functionality contained in the description of the new code. When the new code's actual functionality corresponds to the restrictions made by the first application, e.g., during a test of the new code, the first application determines that the functionality of the new code corresponds to that contained in the description of the new code. Thus, the first application reads the description of the new code, determines, for example, the new code's read/write access to a directory, and restricts the read/write access of the new code to the directory contained in the description. The first application determines that the functionality of the new code corresponds to that contained in the description of the new code when the new code limits its read/write access to the directory corresponding to the restriction made by the first application.

When the functionality of the new code does not correspond to the description of the functionality of the new code, at 107 the first application does not load the new code. Optionally, the first application transmits a message to the second application stating that the new code cannot be loaded and/or providing a reason.

Conversely, when the functionality of the new code corresponds to the description of the functionality of the new code, at 110 the first application dynamically, i.e., while the first application is running, loads the new code. While loading, the first application creates entry points into the new code. For example, if the new code is in JAVA™ programming language, the first application dynamically loads new classes using custom class loaders as entry points. As another example, if the new code is in C++ programming language, function pointers (or a table of function pointers) into the new code are used as entry points.

In one embodiment, the first application loads the new code without user interaction. Alternatively, the first application may load the new code only after notification to a user who confirms that the first application may load the new code. In one embodiment, the first application loads the new code in the same process as the first application. In an alternative embodiment, the first application loads the new code in a process that is separate from the first application, wherein the new code runs in a separate process. When the new code is loaded in a separate process, a mechanism for inter-process communication between the first application and the new code is generated (e.g., the first application modifies itself pursuant to information, which, for example, may be provided by a user, regarding the use and configuration of the new code), so that the first application is able to call into the new code.

At 112, the first application tests the new code for compatibility and functionality, in order to determine whether the new code runs properly. In one embodiment, the first application tests the new code separately from the existing code of the first application. However, the first application can test the entire revised code, i.e., the existing code of the first application integrated with the new code. When the new code does not run properly, at 113 the first application unloads the new code. Optionally, the first application can transmit a message to the second application stating that the new code has failed. Conversely, when the new code runs properly, at 114 the first application stores the new code, for example, on a hard drive, and at 116 transmits a message to the second application indicating that the new code is successfully received.

FIG. 1a and FIG. 1b describe the technique in terms of a method. However, one should also understand it to represent a machine-accessible medium having recorded, encoded or otherwise represented thereon instructions, routines, operations, control codes, or the like, that when executed by or otherwise utilized by an electronic system, cause the electronic system to perform the method as described above or other embodiments thereof that are within the scope of this disclosure.

Figure 2:
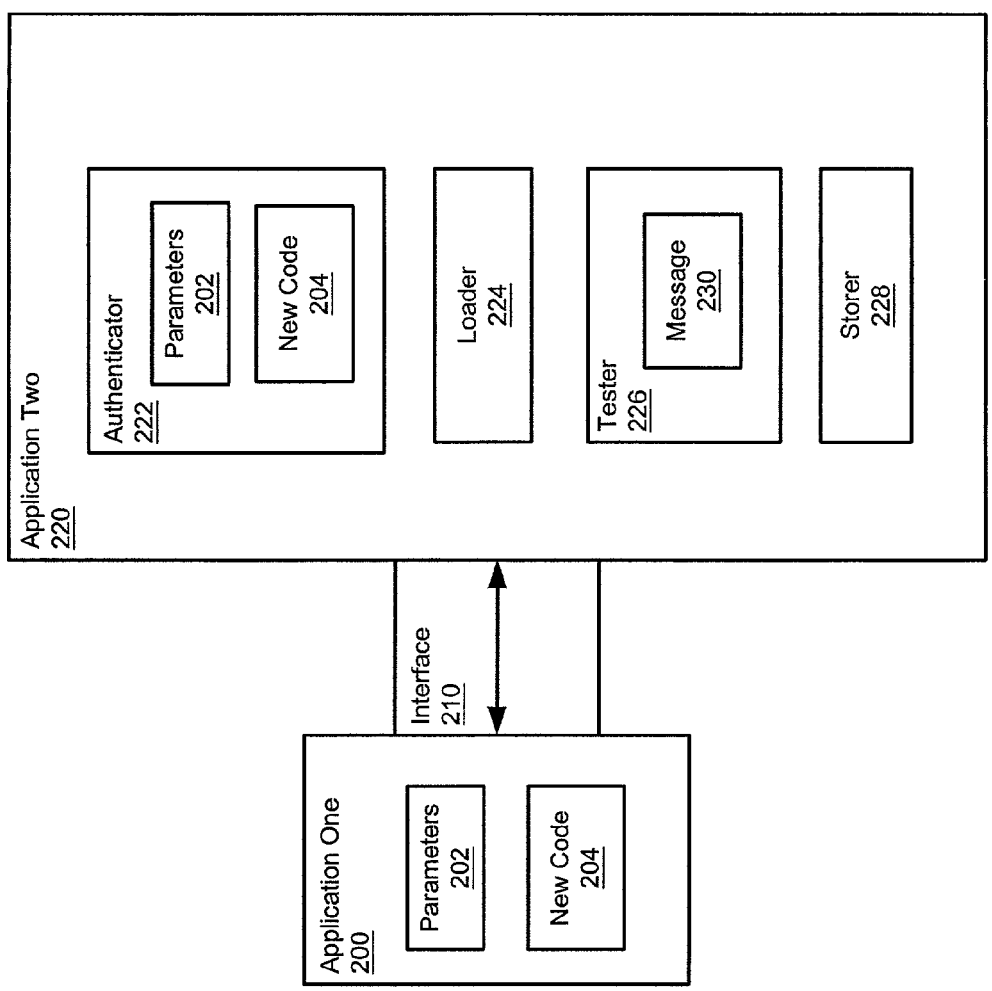
FIG. 2 is a block diagram of one embodiment of a first application program receiving parameters and new code from a second application program.

FIG. 2 is a block diagram of one embodiment of an application program receiving parameters and new code from another application program. Application One 200 makes a procedure call to Application Two 220 via interface 210. Application One 200 transmits parameters 202 and new code 204 to Application Two 220 in connection with the remote procedure call. Authenticator 222 uses parameters 202 to verify whether new code 204 is authorized to be added to Application Two 220, and uses parameters 202 and new code 204 to verify the functionality of new code 204. When authenticator 222 verifies that new code 204 is authorized to be added and verifies its functionality, loader 224 loads new code 204. Tester 226 tests new code 204 in order to determine whether new code 204 runs properly. When tester 226 determines that new code 204 runs properly, storer 228 stores new code 204 and tester 226 transmits message 230 to Application One 200 indicating that new code 204 is successfully received.

Figure 3:
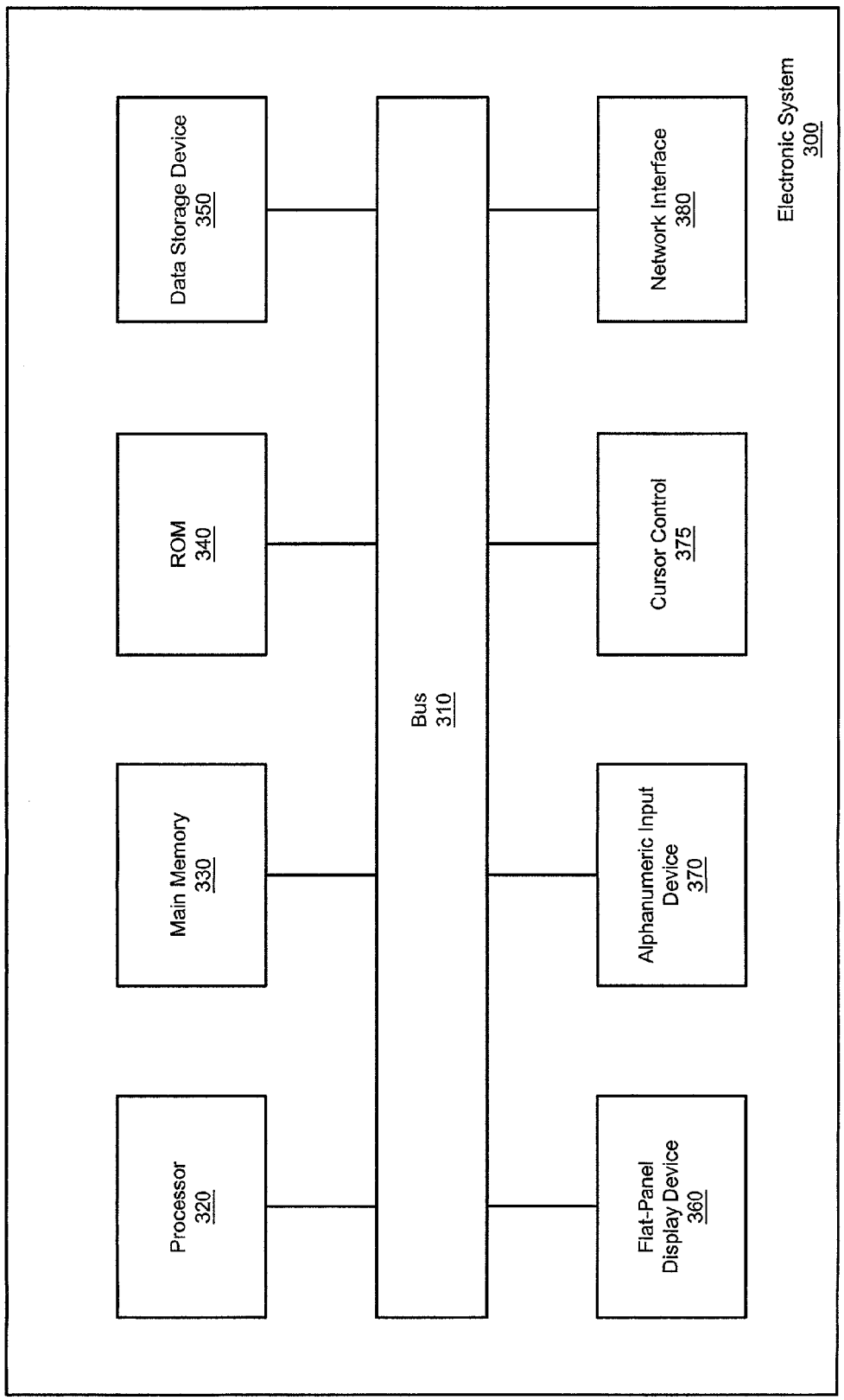
FIG. 3 is a block diagram of an electronic system.

FIG. 3 is a block diagram of one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. In one embodiment, the technique of FIG. 1 can be implemented as sequences of instructions executed by an electronic system. The sequences of instructions can be stored by the electronic system, or the instructions can be received by the electronic system (e.g., via a network connection). The electronic system can be coupled to a wired or wireless network.

Electronic system 300 includes a bus 310 or other communication device to communicate information, and processor 320 coupled to bus 310 to process information. While electronic system 300 is illustrated with a single processor, electronic system 300 can include multiple processors and/or co-processors.

Electronic system 300 further includes random access memory (RAM) or other dynamic storage device 330 (referred to as memory), coupled to bus 310 to store information and instructions to be executed by processor 320. Memory 330 also can be used to store temporary variables or other intermediate information while processor 320 is executing instructions. Electronic system 300 also includes read-only memory (ROM) and/or other static storage device 340 coupled to bus 310 to store static information and instructions for processor 320. In addition, data storage device 350 is coupled to bus 310 to store information and instructions. Data storage device 350 may comprise a magnetic disk (e.g., a hard disk) or optical disc (e.g., a CD-ROM) and corresponding drive.

Electronic system 300 may further comprise a flat-panel display device 360, such as a cathode ray tube (CRT) or liquid crystal display (LCD), to display information to a user. Alphanumeric input device 370, including alphanumeric and other keys, is typically coupled to bus 310 to communicate information and command selections to processor 320. Another type of user input device is cursor control 375, such as a mouse, a trackball, or cursor direction keys to communicate direction information and command selections to processor 320 and to control cursor movement on flat-panel display device 360. Electronic system 300 further includes network interface 380 to provide access to a network, such as a local area network.

Instructions are provided to memory from a machine-accessible medium, or an external storage device accessible via a remote connection (e.g., over a network via network interface 380) providing access to one or more electronically-accessible media, etc. A machine-accessible medium includes any mechanism that provides (i.e., stores) information in a form readable by a machine (e.g., a computer). For example, a machine-accessible storage medium such as RAM; ROM; magnetic or optical storage medium; flash memory devices; etc.

In alternative embodiments, hard-wired circuitry can be used in place of or in combination with software instructions to implement the embodiments of the present invention. Thus, the embodiments of the present invention are not limited to any specific combination of hardware circuitry and software instructions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
receiving a remote procedure call having one or more parameters associated with the remote procedure call, the one or more parameters comprising a predefined interface into new code to allow a receiving program to integrate the new code by making a call to the new code, wherein the receiving program is running on an electronic device;
receiving the new code associated with the remote procedure call;
making a first determination, based at least in part on the one or more parameters, whether the new code is authorized, by a digital signature that is part of the one or more parameters;
testing a functionality of the new code by comparing the functionality of the new code to a description of an expected functionality of the new code, wherein the description is part of the one or more parameters;
making a second determination whether the functionality of the new code corresponds to the description of code to be added to the program; and
adding the new code to the program while running the program on the electronic device, based on the first and second determinations by providing one or more corresponding entry points.

2. The method of claim 1, wherein the digital signature comprises the new code encrypted using a public key infrastructure.

3. The method of claim 1, wherein making a first determination based at least in part on the one or more parameters whether the new code is authorized comprises verifying the digital signature.

4. The method of claim 1, wherein making a second determination whether functionality of the new code corresponds to a description of code to be added to the program comprises verifying that the functionality of the new code corresponds to the description of the functionality of the new code.

5. The method of claim 4, wherein verifying that the description of the new code describes the new code comprises:
testing the description of the new code in order to determine a description of a functionality of the new code; and testing the new code in order to determine that the functionality of the new code corresponds to the description of the functionality of the new code by determining whether the new code runs properly, storing the new code, and providing a notification of the proper operation of the new code when the new code run properly.

6. The method of claim 4, wherein verifying that the description of the new code describes the new code comprises:

reading the new code in order to determine a description of an accessibility of the new code;

restricting the accessibility of the new code to the accessibility corresponding to the description of the accessibility of the new code; and determining that the description of the new code describes the new code when an actual accessibility of the new code corresponds to the description of the accessibility of the new code.

7. The method of claim 6, wherein the accessibility comprises a read/write access.

8. The method of claim 1, wherein the new code comprises JAVA™ programming language.

9. An article of manufacture comprising:

a machine-accessible storage medium including thereon sequences of instructions that, when executed, cause an electronic system to:

receive a remote procedure call having one or more parameters associated with the remote procedure call, the one or more parameters comprising a predefined interface into new code to allow a receiving program to integrate the new code by making a call to the new code; and at least an indication of a memory location corresponding to the new code;

receive the new code associated with the remote procedure call;

make a first determination, based at least in part on the one or more parameters, whether the new code is authorized, by a digital signature that is part of the one or more parameters;

test a functionality of the new code by comparing the functionality of the new code to a description of an expected functionality of the new code, wherein the description is part of the one or more parameters;

make a second determination whether the functionality of the new code corresponds to the description of code to be added to the program; and add the new code to the program while running the program on the electronic system, based on the first and second determinations by providing one or more corresponding entry points.

10. The article of manufacture of claim 9, wherein the sequences of instructions that, when executed, cause the electronic system to make a first determination, based at least in part on the one or more parameters, whether the new code is authorized, comprise sequences of instructions that, when executed, cause the electronic system to verify the digital signature.

11. The article of manufacture of claim 9, wherein the sequences of instructions that, when executed, cause the electronic system to make a first determination, based at least in part on the one or more parameters, whether the new code is authorized, comprise sequences of instructions that, when executed, cause the electronic system to verify that the description of the new code describes the new code.

12. The article of manufacture of claim 11, wherein the sequences of instructions that, when executed, cause the electronic system to verify that the description of the new code describes the new code, comprise sequences of instructions that, when executed, cause the electronic system to:

test the description of the new code in order to determine a description of a functionality of the new code; and test the new code in order to determine that the functionality of the new code corresponds to the description of the functionality of the new code by determining whether the new code runs properly, storing the new code, and providing a notification of the proper operation of the new code when the new code run properly.

13. The article of manufacture of claim 11, wherein the sequences of instructions that, when executed, cause the electronic system to verify that the description of the new code describes the new code, comprise sequences of instructions that, when executed, cause the electronic system to:

read the new code in order to determine a description of an accessibility of the new code;

restrict the accessibility of the new code to the accessibility corresponding to the description of the accessibility of the new code; and determine that the description of the new code describes the new code when an actual accessibility of the new code corresponds to the description of the accessibility of the new code.

14. The article of manufacture of claim 13, wherein the sequences of instructions that, when executed, cause the electronic system to read the new code in order to determine the description of the accessibility of the new code, comprise sequences of instructions that, when executed, cause the electronic system to read the new code in order to determine the description of a read/write access of the new code.

15. The article of manufacture of claim 9, wherein the sequences of instructions that, when executed, cause the electronic system to receive the new code comprise sequences of instructions that, when executed, cause the electronic system to receive a JAVA™ programming language file.

16. The article of manufacture of claim 9, wherein the machine-accessible medium further comprises sequences of instructions that, when executed, cause the electronic system to:

determine whether the new code runs properly;

store the new code; and provide a notification of the proper operation of the new code when the new code runs properly.

17. The article of manufacture of claim 16, wherein the sequences of instructions that, when executed, cause the electronic system to comprise sequences of instructions that, when executed, cause the electronic system to test the new code.

18. A system comprising:

a storage medium having a data repository to receive a remote procedure call and one or more parameters associated with the remote procedure call; and to receive new code; wherein the one or more parameters including a predefined interface into the new code to allow a receiving program to integrate the new code by making a call to the new code; and a processing system coupled with the data repository, the processing system to retrieve information from the data repository and, in response, to make a first determination, based at least in part on the one or more parameters, whether the new code is authorized, by a digital signature that is part of the one or more parameters, make a second determination whether functionality of the new code corresponds to a description of code to be added to the program, wherein the description is part of the one or more parameters, test the new code to determine whether the new code runs properly and add the new code to a program while running the program based on the first and second determinations by making a call to the new code via the predefined interface.

19. The system of claim 18, further comprising a storage area where the processing system stores the new code, if the new code runs properly.

20. The system of claim 18, wherein the parameters comprise a digital signature.

21. The system of claim 20, wherein determining based at least in part on the one or more parameters whether the new code is authorized comprises verifying the digital signature.

22. The system of claim 20, wherein make a first determination based at least in part on the one or more parameters whether the new code is authorized comprises verifying that the description of the new code describes the new code.

23. The system of claim 18, wherein the new code comprises JAVA™ programming language.

24. An article of manufacture comprising:
a machine-accessible storage medium including thereon sequences of instructions that, when executed, cause an electronic system to:
receive a remote procedure call having one or more parameters comprising a non-predefined interface to new code, the one or more parameters allow a receiving program to integrate the new code by modifying itself in accordance with information regarding usage and configuration of the new code;
the one or more parameters comprising at least an indication of a memory location corresponding to the new code;
receive the new code associated with the remote procedure call;
make a first determination, based at least in part on the one or more parameters, whether the new code is authorized, by a digital signature that is part of the one or more parameters;
test a functionality of the new code by comparing the functionality of the new code to a description of an expected functionality of the new code, wherein the description is part of the one or more parameters;
make a second determination whether the functionality of the new code corresponds to the description of code to be added to the program; and
add the new code to the program while running the program on the electronic system, based on the first and second determinations by providing one or more corresponding entry points.

25. The article of manufacture of claim 24, wherein the sequences of instructions that, when executed, cause the electronic system to make a first determination, based at least in part on the one or more parameters, whether the new code is authorized, comprise sequences of instructions that, when executed, cause the electronic system to verify the digital signature.

26. The article of manufacture of claim 24, wherein the sequences of instructions that, when executed, cause the electronic system to make a first determination, based at least in part on the one or more parameters, whether the new code is authorized, comprise sequences of instructions that, when executed, cause the electronic system to verify that the description of the new code describes the new code.

27. The article of manufacture of claim 26, wherein the sequences of instructions that, when executed, cause the electronic system to verify that the description of the new code describes the new code, comprise sequences of instructions that, when executed, cause the electronic system to:
test the description of the new code in order to determine a description of a functionality of the new code; and
test the new code in order to determine that the functionality of the new code corresponds to the description of the functionality of the new code by determining whether the new code runs properly, storing the new code, and providing a notification of the proper operation of the new code when the new code run properly.

28. The article of manufacture of claim 26, wherein the sequences of instructions that, when executed, cause the electronic system to verify that the description of the new code describes the new code, comprise sequences of instructions that, when executed, cause the electronic system to:
read the new code in order to determine a description of an accessibility of the new code;
restrict the accessibility of the new code to the accessibility corresponding to the description of the accessibility of the new code; and
determine that the description of the new code describes the new code when an actual accessibility of the new code corresponds to the description of the accessibility of the new code.

29. The article of manufacture of claim 24, wherein the sequences of instructions that, when executed, cause the electronic system to read the new code in order to determine the description of the accessibility of the new code, comprise sequences of instructions that, when executed, cause the electronic system to read the new code in order to determine the description of a read/write access of the new code.

30. The article of manufacture of claim 24, wherein the sequences of instructions that, when executed, cause the electronic system to receive the new code comprise sequences of instructions that, when executed, cause the electronic system to receive a JAVA™ programming language file.

* * * * *